Patented Sept. 10, 1929.

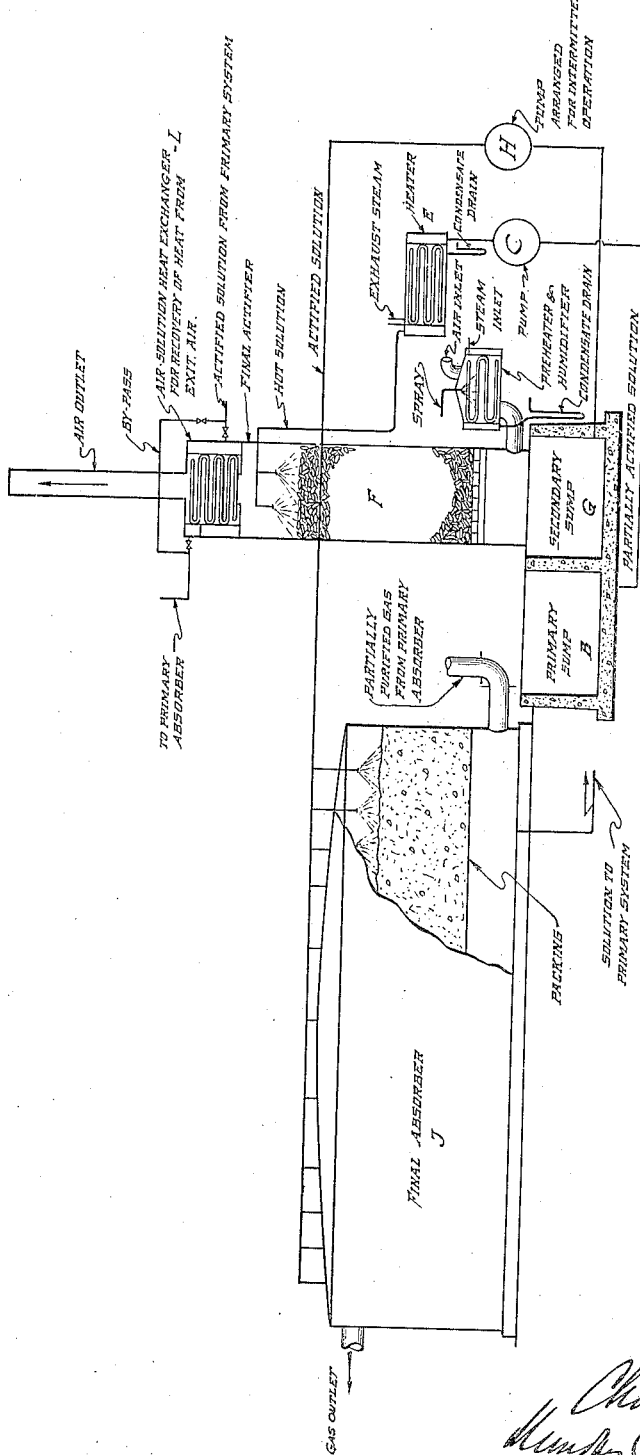

1,727,559

UNITED STATES PATENT OFFICE.

CHARLES J. RAMSBURG, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS-PURIFICATION PROCESS.

Application filed September 8, 1923. Serial No. 661,695.

This invention relates to the removal of hydrogen sulphide and other noxious constituents, such as hydrocyanic acid, from gases containing them. An object of the invention is to provide an improved process for treating such gases, whereby not only the bulk of the hydrogen sulphide is removed but even the last traces of it, with the result that it will be found unnecessary to subject the purified gas to any treatment in the usual iron oxide boxes.

The invention is of particular utility in connection with a gas purification process operating generally in accordance with that process described and claimed in the prior Letters Patent of the United States of David L. Jacobson, for process for purifying gases, No. 1,390,037 granted September 6, 1921. Such Jacobson gas purification liquid process includes bringing the gas to be purified into direct contact with an alkaline absorbent agent, such as solution of sodium carbonate, to absorb the noxious constituents from the gas, and then subjecting the absorbent agent containing the absorbed impurities to aeration to remove the absorbed impurities and to regenerate the absorbent agent so as to render it available for further gas purification. The present invention, however, is not confined to the process just referred to, but is broadly applicable to a variety of processes based on the employment of liquid media for gas purification.

A process such as that of the above mentioned prior patent may be practiced in two essential parts of apparatus, i. e., the chamber in which the gas is brought into contact with the purifying liquid, and the chamber in which the liquid containing the absorbed impurities is regenerated. In practice the first chamber is designated as the "absorber" and the second the "actifier". These two terms will be employed in the following description.

The removal of the last traces of the hydrogen sulphide from the gas is a requirement that most gas companies must meet, being imposed by law in most places. By this invention, there is provided a process and apparatus whereby the last traces of hydrogen sulphide are removed from the gas by a system of liquid purification, complete in itself, without any resort whatever to ordinary iron oxide purification of the gas discharged from the liquid purification plant. Hydrocyanic acid is also completely removed, with resulting improvement in the quality of the gas.

In addition to the general objects recited above, the invention has for further objects such other improvements or advantages in operation and results as are found to obtain in the process and apparatus hereinafter described or claimed.

In the accompanying drawings forming a part of this specification and showing, for purposes of exemplification, a preferred form and manner in which the invention may be embodied and practiced, but without limiting the claimed invention specifically to said illustrative instances. The figure is an elevational view, partially diagrammatic, of one form of apparatus for carrying out the improved process of the invention.

In its present embodiment, the invention is applied to the purification of coke oven gas, and, for convenience, the present description will be confined to this use of the invention. Features of the invention are, however, applicable to other useful applications, for example, to other gases. Consequently, the invention is not confined in scope to the specific use and embodiment herein described as an illustrative example.

The "primary system" hereinafter referred to is whatever liquid purification system may be employed for removing the bulk of the above-mentioned impurities from the gas, the present invention then being employed to remove the remaining traces of such impurities and constituting the secondary system; and the particular primary system hereinafter referred to as an illustrative example, but without limitation thereto, is that of the above-mentioned Jacobson Patent No. 1,390,037 and especially the form of it described as a primary (absorber and actifier) system in the exemplifying specifications of the co-pending Bird application Serial No. 603,062, filed November 24, 1922, Patent No. 1,660,741, and in my co-pending application Serial No. 614,582 filed January 24, 1923.

In the preferred primary system for effecting the absorption of the sulphur compounds and other impurities from the gas, there is employed a water solution of an alkaline compound having an affinity for hydrogen sulphide. A number of the compounds of the alkali metals and alkaline-earth metals possess this property. A solution of sodium carbonate in water is especially suitable for effecting the absorption of sulphur from the gas, because of the great affinity which a water solution of sodium carbonate has for hydrogen sulphide and because of the cheapness and availability of this sodium salt. A solution of sodium carbonate is strongly basic in its properties. When sodium carbonate dissolved in water is brought into contact with gas, such as coke oven gas, containing carbon dioxide and hydrogen sulphide, carbon dioxide is absorbed, and sodium bicarbonate is formed, as may for example, be illustrated by the following explanation:

$$CO_2 + Na_2CO_3 + H_2O = 2NaHCO_3$$

The solution of sodium carbonate will also effect the absorption from the gas of such sulphur compounds as hydrogen sulphide, $H_2S$. The absorption of hydrogen sulphide may be illustrated by the following equation:

$$Na_2CO_3 + H_2S = NaHCO_3 + NaHS$$

In applying the above to the absorption of sulphur from a gas, it is preferable to use a dilute solution of sodium carbonate in water. A concentration from about two to about five percentum of sodium carbonate will usually be found satisfactory.

In such preferred primary system the regeneration of the solution containing the absorbed impurities in the primary actifier may be illustrated by the following equations:

$$2NaHCO_3 = Na_2CO_3 + CO_2 + H_2O$$
$$2NaHS + CO_2 + H_2O = Na_2CO_3 + 2H_2S$$

and also:

$$NaHCO_3 + NaHS = Na_2CO_3 + H_2S$$

The rapid and thorough aeration greatly promotes the foregoing reactions by rapidly removing the gaseous products, as well as checking the formation of thiosulphates, and the solution gives up its hydrogen sulphide and is rejuvenated. Instead of air, another similarly inert gas may be used in the primary actifier.

In such primary system, the gas to be purified is first passed through the primary absorber, and there is brought into contact with a solution of sodium carbonate pumped from a primary sump through pipes and sprays. The impure gas enters the bottom of the primary absorber and the gas from which the bulk of the impurities have been removed discharges from the top of the primary absorber. The solution containing the absorbed impurities from the bottom of the primary absorber runs through pipes and is discharged by sprays into the top of the primary actifier. There the absorbed impurities are removed by means of air blown into the bottom of the actifier. The air escapes through a stack passing from the top of the primary actifier up through the middle of the primary absorber. The solution thus regenerated runs into the primary sump and is used over and over again. The major portion of the impurities are removed from the gas in the primary absorber, and the remaining lesser portion are removed by the secondary system of the present invention, employing a correspondingly smaller bulk of liquid which has undergone a special treatment, as hereinafter illustratively described.

The present invention is a development of the complete purification process of the aforesaid Bird application, but differs from Bird's specific embodiment of his generic invention. According to the present invention, a portion of the actified solution may be withdrawn from the primary system to supply the secondary system; but, in the secondary system instead of allowing only air for regenerating the solution, heating is employed in addition to the air. This has the advantage of reducing the quantity of air necessary in the secondary actifier. The employment of heat possesses the advantage that it gives to the soda solution a higher partial pressure with respect to hydrogen sulphide, thereby greatly simplifying the process of removing the hydrogen sulphide by aeration. Heat may be supplied either to the solution or to the air, or to both, as desired, the same object being attained in any case.

It has been found to be most convenient and economical to operate in such a way that approximately 90% of the hydrogen sulphide and hydrocyanic acid are removed from the gas in the primary system. Absolute purification is difficult of accomplishment in a single stage system of this sort without very greatly decreasing its capacity. When a single stage liquid purification system is employed, a little hydrogen sulphide remains in the form of alkaline hydro-sulphide in the solution going from the actifier D to the primary sump B. In order to use this solution to remove the last traces of hydrogen sulphide from the gas, in the second stage of the process, the last traces of hydrosulphides must be removed from the solution. On the other hand, since only traces of hydrogen sulphide remain in the gas passing out of the primary absorber A, only a small volume of solution will be required to furnish the alkali necessary to remove all of the hydrogen sulphide. The essential condition is that the solution thus employed for the removal of these traces from the gas be free from sulphide compounds such as exert a partial pressure with respect to hydrogen sulphide, and, as a further important condition, that the solution, in the second stage, be distributed over a very large surface to insure thorough contact with the gas. Analogous considerations apply to hydrocyanic acid and cyanide compounds.

In mechanical details of operation and construction this process does not differ greatly from that of Bird's already cited, save in the introduction of heat to the solution to be actified, and in the reduction of the amount of air necessary for actification. The heat may be supplied by passing the solution over steam coils prior to its introduction into the actifier or by means of steam coils in the actifier or by passing the incoming air over heated surfaces, or by a combination of any two or all three of these methods. The temperature regulation need not be very exact, in general a higher temperature requires at the same time less air, and a lower temperature more air, so that considerable flexibility in operation may be obtained. A preferred average temperature for the incoming air, and for the solution in the actifier is approximately 50° C. (122° F.) but if an ample supply of exhaust steam is available a higher temperature may be more suitable. If desired, the air may be saturated with moisture at this temperature prior to its introduction into the actifier. In this manner cooling in the actifier due to evaporation of the solution is diminished.

This process possesses a very important advantage over the use of air alone for actification because of the great reduction in the amount of air which must be blown through the solution. This process may reduce the amount of air to approximately 30–40% of that required by the process of Bird, with a corresponding reduction in operating expense. This reduction in the amount of air which must be blown through the solution permits a reduction in the size of the apparatus used, thereby reducing construction costs. Moreover, since it is much cheaper to pump the solution over a small tower, pumping costs are reduced.

The details of the process will be understood by reference to the attached sketch. The partially actified solution of the primary system is pumped by pump C from the primary sump B through the exhaust steam heater E where its temperature is raised as desired, then over the secondary or final actifier F where it is brought in intimate contact with air and flows by gravity to the secondary sump G. It may then be pumped intermittently over the secondary or final absorber J. Such intermittent pumping of the actified solution to the final absorber is preferable for the reason that much better distribution of the solution over the material in the final absorber can be obtained by pumping a large volume in a short time than by pumping a small volume continuously. From this final absorber J the solution is returned to the primary system. In the actifier F, countercurrent to the solution flow, there is blown a current of air which may be preheated and humidified in K. A portion of the heat carried out of the actifier F by the exit air may be conserved by use of the air-solution-heat exchanger L. Through this, cold actified solution from the primary system may be passed in such a manner as to absorb heat from the hot exit air. The warm primary solution thus obtained may then be passed to the primary absorber. This heat may assist in preventing naphthalene stoppages in the primary absorber. Temperature regulation in this primary system may be secured by by-passing any desired proportion of the solution around heat exchanger L, as shown.

The preheating of the air, and the recovery of the heat from the exit air may or may not be practiced or desired, without in any way departing from the spirit of this invention.

The invention as hereinabove set forth may be variously embodied within the scope of the claims hereinafter made.

I claim:

1. The process of purifying gases, which consists in: passing the gas through a mass of non-reacting solid material permeable by and drenched with a solution reactive to the impurities in the gas, discharging the solution from the non-reacting material, regenerating it by heating and aeration, and intermittently drenching the non-reacting material with the regenerated solution; substantially as specified.

2. The process of removing hydrogen sulphide constituents from gases, which consists in: passing the gas through a mass of non-reacting solid material permeable by and drenched with a solution reactive to the hydrogen sulphide impurities in the gas, discharging the solution, regenerating it by heating and aeration, and intermittently drenching the non-reacting material with the regenerated solution; substantially as specified.

3. In a process for the purification of gas that involves circulating a liquid absorbent agent continuously through a gas purification stage and a regeneration stage, withdrawing a portion of the regenerated liquid from the regeneration stage, removing last traces of impurities from it by subjecting it to a secondary aeration in a filler which presents a multitude of minute openings to the flow of media and effects intimate contact of the heated solution with secondary aeration gas, and finally bringing it into contact with the gas from the gas purification stage to remove the last traces of impurities, the improvement which comprises heating the withdrawn portion of the regenerated liquid prior to said secondary aeration.

4. In a process for the purification of gas that involves circulating a liquid absorbent agent continuously through a gas purification stage and an aeration stage, withdrawing a portion of the liquid from the primary aeration stage, subjecting it to further aeration while the solution is distributed over a very large surface and has a higher partial pressure, and finally bringing it into contact with the gas from the gas purification stage to remove in a final secondary purification stage the last traces of impurities, the improvement which comprises subjecting the withdrawn portion of the liquid from the primary aeration stage to heat as well as aeration during said further aeration.

In testimony whereof I have hereunto set my hand.

CHARLES J. RAMSBURG.